United States Patent [19]

Guillot

[11] 4,024,905

[45] May 24, 1977

[54] SEALING DEVICE FOR A ROTARY HEAT EXCHANGER, IN PARTICULAR FOR A GAS TURBINE

[75] Inventor: Jack Guillot, Juvisy sur Orge, France

[73] Assignee: Bennes Marrel, Andreziux Boutheon, France

[22] Filed: Oct. 15, 1973

[21] Appl. No.: 406,418

[30] Foreign Application Priority Data

Oct. 19, 1972 France ............................. 72.38112

[52] U.S. Cl. .................................... 165/9; 277/82; 277/88
[51] Int. Cl.² ....................................... F28D 19/00
[58] Field of Search ............. 165/9; 277/82, 88, 96

[56] References Cited

UNITED STATES PATENTS

| | | | |
|---|---|---|---|
| 2,743,945 | 5/1956 | Bentele et al. | 165/9 X |
| 3,301,317 | 1/1967 | Weaving et al. | 165/9 X |
| 3,667,220 | 6/1972 | Debeyser | 165/9 X |

Primary Examiner—Albert W. Davis, Jr.
Attorney, Agent, or Firm—Sughrue, Rothwell, Mion, Zinn & Macpeak

[57] ABSTRACT

A sealing device located between a static surface of a gas turbine and a rotating heat exchanger surface is comprised of a plurality of outwardly opening U-shaped shoes sealingly connected to the static surface by a bellows and a plurality of U-shaped compression members telescopically disposed within the U-shaped shoes and biased outwardly into engagement with the rotating heat exchanger surface by a plurality of springs.

4 Claims, 6 Drawing Figures

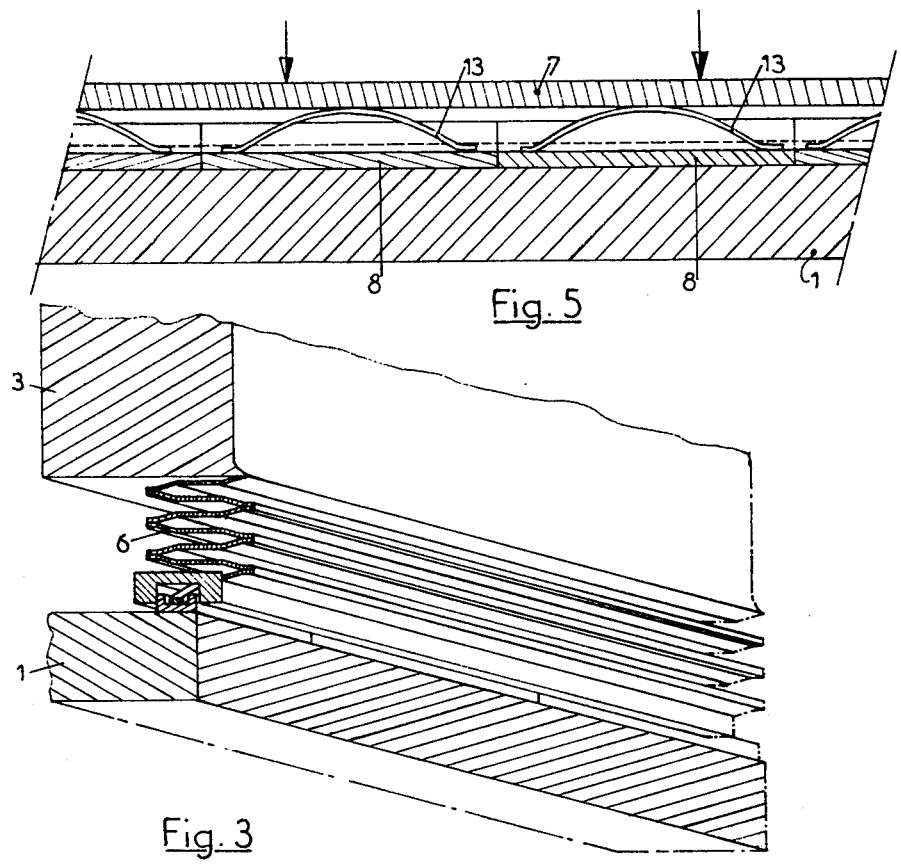
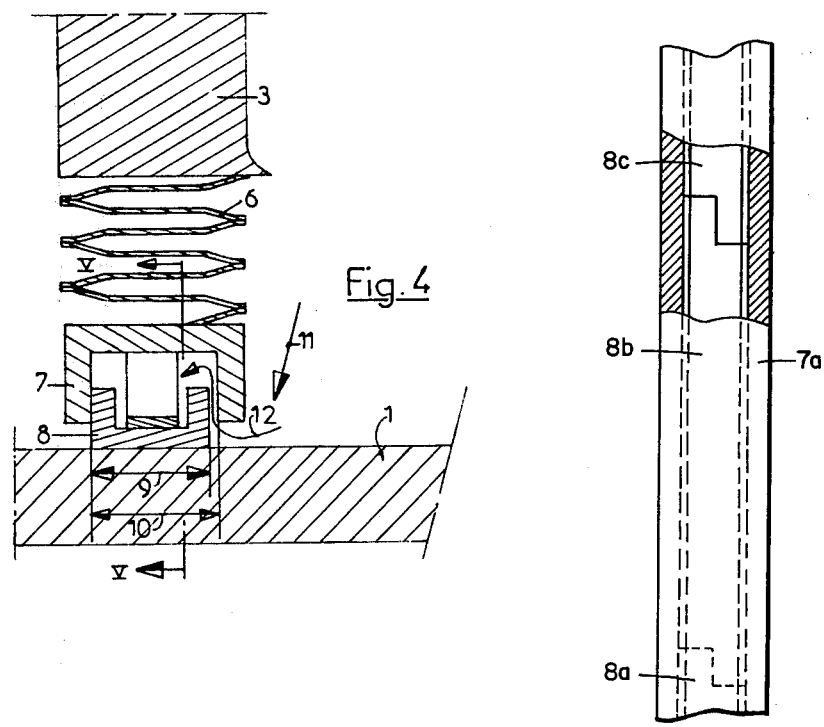

SEALING DEVICE FOR A ROTARY HEAT EXCHANGER, IN PARTICULAR FOR A GAS TURBINE

The present invention relates to a new device for ensuring lateral tightness in a rotary heat exchanger of the type fitted, for instance to gas turbines.

There is known a rotary heat exchanger constituted by a disc of porous ceramic material, which rotates while being interposed between the air suction line of the turbine, on the one hand, and the discharge duct for the exhaust gases, on the other hand. The tightness between the section corresponding to the path of the hot exhaust gases is ensured by compression rings resiliently applied on the side surfaces of the ceramic disc.

It is found in the practice that, with the known sealing devices, internal leaks occur when the power supplied by the turbine increases up to about its nominal value, whereby the overall efficiency of the apparatus is lowered. Such internal leaks are due to a lack of tightness resulting from the uneven deformation of the side walls of the ceramic disc during the operation of the apparatus. As a matter of fact, it is known that the disc of an exchanger has normally a diameter of about forty centimetres. This disc rotates at low speed (such as, for instance, twenty r.p.m.), each point of its lateral surface passing successively from an area exposed to exhaust gases under a pressure of one bar (14.50 lb/sq.in.) and a temperature of about 650° C to an area exposed to incoming air (about four bars and 200° C). After passing through the ceramic disc, the temperature of the exhaust gases drops to 250° C, while, on the contrary, the temperature of the incoming air rises to about 380° C. Under such conditions, owing to the thermal inertia of the ceramic material, it is readily understood that the latter is deformed in a heterogeneous way and, in particular, the lateral surfaces of the disc tend to have a profile which is not plane.

The present invention aims at improving the efficiency of the reducing the leaks by means of a device adapted to provide an efficient tightness under all working conditions.

A sealing device according to the invention, intended to be fitted to at least one substantially plane lateral surface of a rotary disc made of porous ceramic material, includes shoes applied against said plane faces according to the contours of the areas to be defined, and is characterized in that, at least in the central portion, each shoe includes at the level of its bearing surface a longitudinal groove inside which a plurality of small compression members are freely housed, said members being disposed end to end with respect to each other, while return means keep each of them applied against the rotary disc of the exchanger.

According to a feature of the invention, the return means applying the compression members against the disc are constituted by a mere passageway ensuring the connection between the rear side of the compression member in the groove in the shoe and the surrounding area which is at a higher pressure, so that the compression members are kept applied against the disc merely by the action of differential pressure.

According to a further feature of the invention, a small compression spring is provided, besides, between each compression member and the bottom of the groove in the shoe, the force of said spring being just adequate to compensate for the weight of the compression member, in order to ensure the tightness even at the start, before a difference in pressure appears.

According to an additional feature of the invention, the ends of each compression member have bayonet-like sections, which makes it possible to connect each compression member sealingly to the adjacent compression members, while allowing the longitudinal expansions to take place freely.

According to an additional feature of the invention, all the shoes are provided with compression members of the above-mentioned type, that is, over the whole periphery of the contour defining the areas of admission and of exhaust for the gases.

Under such conditions, it will be seen that, if the lateral surface of the ceramic disc is no longer plane, that is, for instance, is deformed slightly to the shape of an umbrella, the compression members remain sealingly applied against said lateral surface, and fill thus the interstice which tends to appear locally between said surface and the shoes.

The accompanying drawing, given by way of non-limiting example, will enable the features of the invention to be clearly understood.

FIG. 3 is a detailed view of sealing members.

FIG. 4 is a cross-sectional view of same.

FIG. 5 is a sectional view along line V—V of FIG. 4.

FIG. 6 is a partial top view partially broken away, showing the bayonet-like sections of the compression members.

Figure 1:
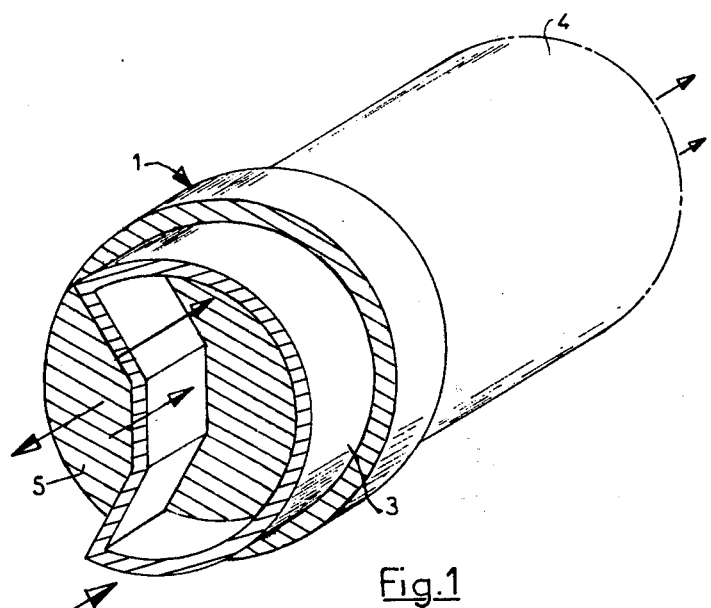
FIG. 1 is a perspective view showing diagrammatically, and on a scale which is not the actual one, the disposition of a sealing device according to the invention on the disc of a rotary heat exchanger.
Figure 2:
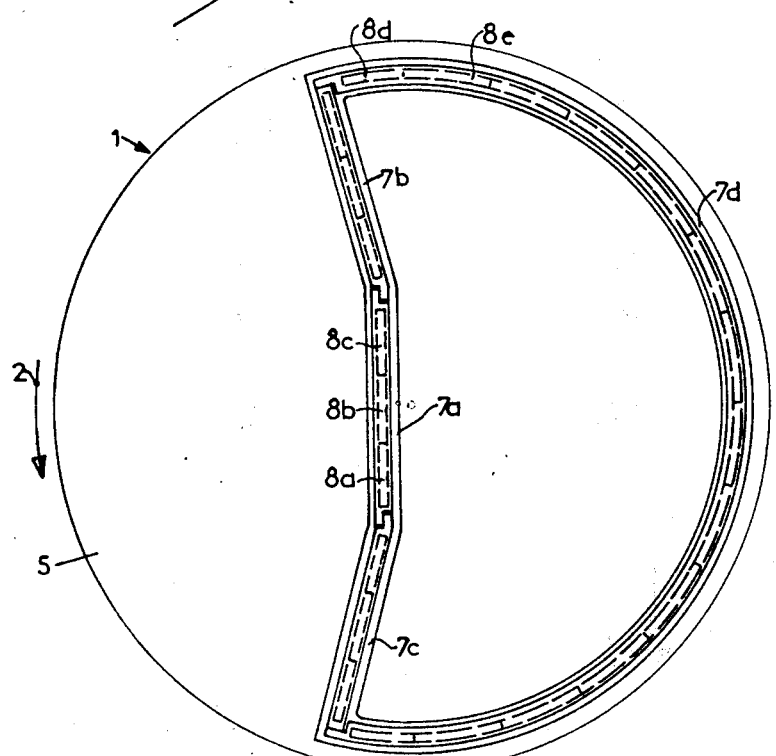
FIG. 2 is a plan view of the rotary disc and one of the sealing devices fitted to the lateral surfaces thereof.

The drawing shows a rotary heat exchanger constituted by a disc 1 of porous ceramic material. This disc turns on itself as indicated in FIG. 2 by the arrow 2. Hot gases (such as, for instance, the exhaust gases of a gas turbine) arrive through a line 3, pass through the porous material of the disc 1, and are discharged through a line 4 disposed on the other side of said disc 1. On the other hand, another fluid (such as, for instance the admission air for a gas turbine) circulates in the reverse direction through the other portion 5 of the disc 1, that is, the portion lying outside disc 1.

Lastly, in a preferred embodiment, small plate springs 13 with corrugated profiles are housed between the opposite bottoms of the U 7 and the U 8.

Of course, the opposite ends of two compression members 8 disposed end to end may have straight sections or bayonet-like sections.

The operation is as follows:

In use, when the ceramic disc 1 rotates, it is subjected to deformations resulting from the differential expansions between its area 5, through which comparatively cold air passes, and the area of the lines 4 and 4, through which hot exhaust gases pass. Thus, the lateral surfaces of the disc 1 are no longer absolutely plane.

Owing to the pressure difference between the two fluid streams (area 5 and area of the lines 3 and 4), the pressure contributes to apply the compression members 8 sealingly against the disc 1. As said compression members 8 are comparatively short, the assembly thereof lies flat, with adequate tightness, against the profile now uneven of the lateral surface of the disc 1, whereby the tightness is ensured.

It is found, as a matter of fact, that, as the disc 1 rotates very slowly (a few revolutions per minute), there is not sufficient time for a distribution of the temperatures among the various areas of said disc. Consequently, there would exist a risk of a leak occurring between the two fluid flows, in particular in the central area of the disc 1, which is no longer plane. The present invention makes it possible to ensure the tightness even in said central area, which corresponds to the compression members 8a, 8b, 8c, of the shoe 7a.

To prevent any internal leak between the two fluids which circulate in opposite directions, it is necessary to provide a stationary sealing device which rubs on each of the lateral plane surfaces of the disc 1, at the level of the opposite ends of the lines 3 and 4. Only that device according to the invention which is fitted to the end of the line 3 will now be described, it being understood that the device provided opposite thereto on the line 3 has a similar structure.

A fluid-tight metallic bellows 6 is fastened along the whole length of the closed periphery defined by the end of the line 3. The opposite end of said bellows is integral with the back of a shoe 7, the latter having an U cross-section (FIG. 4). In the example shown in FIG. 2, it is assumed that the end of the line 3 is provided with four shoes 7 disposed end to end, to wit, a central rectilinear shoe 7a, two rectilinear shoes 7b, 7c connected obliquely to the ends of the shoe 7a, and a long, arcuate shoe 7d, which connects the free ends of the shoes 7b and 7c.

As previously mentioned, each shoe 7 has a U cross-section, the opening of which is directed towards the porous surface of the disc 1. Several compression members 8 are disposed end to end inside each shoe 7. For instance, three compression members 8a, 8b, 8c, may be provided inside the shoe 7a. Fourteen compression members such as 8d, 8e . . . . may likewise be provided inside the shoe 7d. Each compression member 8 has preferably a U cross-section, the back of which rubs on the ceramic disc 1.

It will be seen from FIG. 4 that the outer width 9 of each compression member 8 is smaller than the inner width 10 of the U of each shoe 7. Thus, when the U 8 is housed inside the U 7, a lateral play is defined, through which the fluid outer pressure (arrow 11) may build up inside (arrow 12). This inner pressure thus apply the compression members 8 even when the differential pressure of the steady state is not built up yet.

I claim:

1. A sealing device for use in a gas turbine between a static surface and the axial surfaces of a rotating heat exchanger having a high pressure area on one side of the seal and a lower pressure area on the other side of the seal, comprising:
   a. a plurality of shoe members located completely about the periphery of the area to be sealed, said shoe members having a longitudinal groove in one side thereof such that they have a "U" shape cross section,
   b. a compressible and expansible bellows member having one side sealingly attached to a static surface and the other side sealingly attached to each of said shoe members,
   c. a plurality of compression members having a "U" shaped cross section location in said groove in said shoe members, with the base of the "U" shape protruding beyond said groove, said protruding base sealingly engaging an axial surface of a rotating heat exchanger, the width of the compression members being less than the width of the shoe member groove to allow passage of the high pressure into the area between the compression members and the shoe members and urge said compression members into sealing contact with the rotating heat exchanger, and
   d. spring means located in said shoe member groove and interposed between said shoe members and said compression members so as to bias said compression members into engagement with the rotating heat exchanger, said spring means being just adequate to compensate for the weight of the compression members in order to ensure a sealing engagement before the appearance of a pressure differential on opposite sides of said seal.

2. A sealing device according to claim 1 wherein the ends of each compression member have bayonet-like sections, which makes it possible to connect each compression member sealingly to the adjacent compression members, while allowing the longitudinal expansions to take place freely.

3. A sealing device according to claim 1 wherein at least two compression members are disposed inside each groove in each shoe member.

4. A sealing device according to claim 1 wherein all the shoe members are provided with compression members over the whole periphery of the contour defining the areas to be sealed.

* * * * *